(12) United States Patent
Gu

(10) Patent No.: US 10,506,257 B2
(45) Date of Patent: Dec. 10, 2019

(54) METHOD AND SYSTEM OF VIDEO PROCESSING WITH BACK CHANNEL MESSAGE MANAGEMENT

(71) Applicant: Cybrook Inc., Santa Clara, CA (US)

(72) Inventor: Qunshan Gu, Santa Clara, CA (US)

(73) Assignee: Cybrook Inc., Santa Clara, CA (US)

( * ) Notice: Subject to any disclaimer, the term of this patent is extended or adjusted under 35 U.S.C. 154(b) by 636 days.

(21) Appl. No.: 14/867,143

(22) Filed: Sep. 28, 2015

(65) Prior Publication Data

US 2017/0094297 A1 Mar. 30, 2017

(51) Int. Cl.
*H04N 19/65* (2014.01)
*H04N 19/105* (2014.01)
*H04N 19/172* (2014.01)
*H04N 19/115* (2014.01)
*H04N 19/166* (2014.01)
*H04N 19/89* (2014.01)

(52) U.S. Cl.
CPC ........... *H04N 19/65* (2014.11); *H04N 19/105* (2014.11); *H04N 19/115* (2014.11); *H04N 19/166* (2014.11); *H04N 19/172* (2014.11); *H04N 19/89* (2014.11)

(58) Field of Classification Search
CPC .................................................... H04N 19/65
See application file for complete search history.

(56) References Cited

U.S. PATENT DOCUMENTS

| 5,329,318 | A | 7/1994 | Keith |
| 5,398,072 | A | 3/1995 | Auld |
| 5,594,736 | A | 1/1997 | Tatsumi et al. |
| 5,724,091 | A | 3/1998 | Freeman et al. |
| 6,985,501 | B2 | 1/2006 | Suzuki et al. |
| 7,042,948 | B2 | 5/2006 | Kim et al. |
| 7,272,299 | B2 | 9/2007 | Notoya et al. |
| 7,784,076 | B2 * | 8/2010 | Demircin ............ H04N 19/172 370/465 |
| 7,809,850 | B2 | 10/2010 | Shimizu et al. |
| 7,844,725 | B2 | 11/2010 | Labonte et al. |
| 7,852,764 | B2 | 12/2010 | Yamaguchi et al. |
| 7,969,883 | B2 | 6/2011 | Balint et al. |
| 7,992,177 | B2 | 8/2011 | Perry et al. |
| 8,689,343 | B2 | 4/2014 | De Laet |

(Continued)

FOREIGN PATENT DOCUMENTS

| CN | 1490980 A | 4/2004 |
| CN | 1655547 A | 8/2005 |

(Continued)

*Primary Examiner* — Rowina J Cattungal
(74) *Attorney, Agent, or Firm* — Young Basile Hanlon & MacFarlane, P.C.

(57) ABSTRACT

Systems, apparatuses and methods for decoding and encoding a video stream having multiple frames includes: when decoding, a decoder receives messages from an encoder. The encoder permits the decoder to determine network parameters including bandwidth. The network parameters are returned to the encoder using back channel messages. The encoder determines optimal encoding parameters based on the network parameters. Back channel messages are exchanged between decoder and encoder while the video stream is being decoded to permit the encoder to adapt encoding parameters to changing network conditions.

20 Claims, 8 Drawing Sheets

(56) References Cited

U.S. PATENT DOCUMENTS

| | | |
|---|---|---|
| 9,210,419 B2 | 12/2015 | Barrett et al. |
| 9,537,779 B2 | 1/2017 | Dung Dao |
| 9,756,356 B2 | 9/2017 | Yang et al. |
| 9,998,890 B2 | 6/2018 | Marko |
| 2002/0027884 A1 | 3/2002 | Halme |
| 2002/0044528 A1 | 4/2002 | Pogrebinsky et al. |
| 2002/0064169 A1* | 5/2002 | Gummalla .......... H04L 12/2801 370/412 |
| 2004/0015765 A1 | 1/2004 | Cooper et al. |
| 2007/0223586 A1* | 9/2007 | Nagai .................. H04L 1/0002 375/240.13 |
| 2008/0008270 A1 | 1/2008 | Li et al. |
| 2008/0101466 A1 | 5/2008 | Swenson et al. |
| 2008/0102772 A1 | 5/2008 | Gandhi |
| 2009/0013356 A1 | 1/2009 | Doerr et al. |
| 2009/0021572 A1 | 1/2009 | Garudadri et al. |
| 2009/0070610 A1 | 3/2009 | Nishida et al. |
| 2009/0310670 A1 | 12/2009 | Odagawa et al. |
| 2011/0072148 A1 | 3/2011 | Begen et al. |
| 2011/0149087 A1* | 6/2011 | Jeong .................... H04N 7/148 348/207.1 |
| 2011/0249729 A1 | 10/2011 | Zhou et al. |
| 2011/0280307 A1 | 11/2011 | MacInnis et al. |
| 2013/0315584 A1 | 11/2013 | Hosking |
| 2014/0126715 A1 | 5/2014 | Lum et al. |
| 2015/0019740 A1* | 1/2015 | Zhao .................... H04L 41/5022 709/226 |
| 2015/0181285 A1* | 6/2015 | Zhang .............. H04N 21/42684 725/80 |
| 2015/0215223 A1 | 7/2015 | Spencer |
| 2015/0222555 A1* | 8/2015 | Rickeby .................. H04L 47/34 370/230 |
| 2016/0165059 A1* | 6/2016 | Deng .................. H04M 7/0072 370/252 |

FOREIGN PATENT DOCUMENTS

| | | |
|---|---|---|
| CN | 1764184 A | 4/2006 |
| CN | 1980238 A | 6/2007 |
| CN | 101056418 A | 10/2007 |
| CN | 101207823 A | 6/2008 |
| CN | 101222296 A | 7/2008 |
| CN | 101578842 A | 11/2009 |
| CN | 102106113 A | 6/2011 |
| CN | 103051978 A | 4/2013 |
| CN | 103167359 A | 6/2013 |
| CN | 103931146 A | 7/2014 |
| CN | 104604209 A | 5/2015 |
| CN | 104618195 A | 5/2015 |
| CN | 104683863 A | 6/2015 |
| CN | 104902274 A | 9/2015 |
| CN | 105163134 A | 12/2015 |

* cited by examiner

METHOD AND SYSTEM OF VIDEO PROCESSING WITH BACK CHANNEL MESSAGE MANAGEMENT

TECHNICAL FIELD

This disclosure relates to video encoding and decoding and particularly to video coding and decoding using back channel messaging for real-time transmission.

BACKGROUND OF THE INVENTION

Digital video streams can be encoded to efficiently compress the video into a digital bitstream for storage on non-transitory digital media or streaming transmission through bandwidth-limited communication channels. However, packet loss and other errors may occur during video bitstream transmission or storage, resulting in errors in decoding the bitstream. It is also common that the available channel bandwidth may change from time to time, causing problems in real-time video transmission.

SUMMARY OF THE INVENTION

This disclosure includes aspects of systems, methods and apparatuses for decoding a video bitstream with a computing device, including receiving, from an encoding computing device, information for bandwidth estimation; determining, using a back channel message controller, first parameters based on the received information for bandwidth estimation; transmitting, from the back channel message controller to the encoding computing device, the first parameters; receiving, from the encoding computing device, a video bitstream, wherein the video bitstream is encoded using second parameters, wherein the second parameters are determined based on the first parameters; and decoding the video bitstream.

Another aspect of a disclosed implementation is an apparatus for encoding a video bitstream with a computing device including a memory and a processor operative to execute instructions stored in the memory to receive, from an encoding computing device, information for bandwidth estimation; determine, using a back channel message controller, first parameters associated with the received information for bandwidth estimation; transmit, from the back channel message controller to the encoding computing device, the first parameters; receive, from the encoding computing device, a video bitstream, wherein the video bitstream is encoded using second parameters, wherein the second parameters are based on the first parameters; and decode the video bitstream.

Another aspect of a disclosed implementation is a method for encoding a video bitstream with a computing device, including transmitting information for bandwidth estimation to a decoding computing device; receiving, from the decoding computing device, back channel messages including first parameters based on the information for bandwidth estimation; determining second parameters based on the first parameters using a back channel message controller; encoding a video bitstream based on the second parameters; and transmitting the encoded video bitstream to the decoding computing device.

These and other aspects are described in additional detail below.

BRIEF DESCRIPTION OF THE DRAWINGS

This disclosure refers to the accompanying drawings, where like reference numerals refer to like parts throughout the several views and wherein.

DETAILED DESCRIPTION

Figure 1:
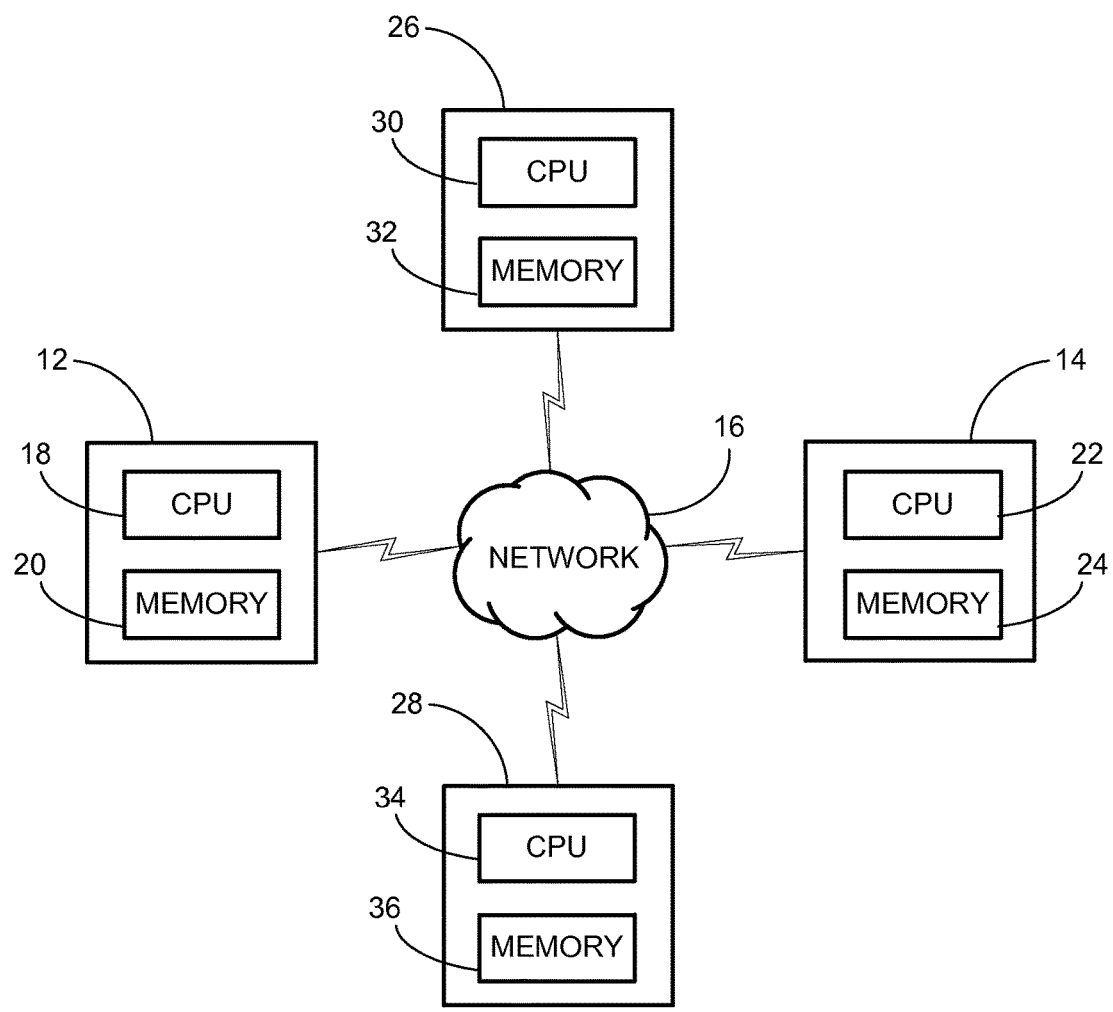
FIG. 1 is a schematic of a video encoding and decoding system in accordance with aspects of disclosed implementations.

Digital video can be used for entertainment, video conferencing, advertising and general information sharing. User expectation for digital video quality can be high, as users expect video over shared internet networks with limited bandwidth to have the same high spatial and temporal quality as video broadcast over dedicated cable channels. Digital video encoding can compress a digital video bitstream to permit high quality digital video to be transmitted over a network having limited bandwidth, for example. Digital video quality can be defined as the degree to which output decompressed and decoded digital video matches the input digital video, for example.

Video encoding and decoding incorporate techniques that compress and decompress digital video streams to permit transmission of high quality digital video streams over networks that can have limited bandwidth capability. These techniques can treat digital video streams as sequences of blocks of digital data and process the blocks to compress the data for transmission or storage and, once received, decompress the blocks to re-create the original digital video stream. This compression and de-compression sequence can be "lossy" in the sense that the de-compressed digital video might not exactly match the input digital video. This can be measured by measuring the difference between pixel data in the input video stream and corresponding pixels in the encoded, transmitted and decoded video stream, for example. The amount of distortion introduced into a digital video stream by encoding and decoding the digital video stream can be a function of the amount of compression, thus the quality of the decoded video can be viewed as a function of the transmission bandwidth.

Aspects of disclosed implementations can permit transmission of compressed video bitstreams over "noisy" or potentially error inducing networks by adjusting the bitrate of the transmitted video bitstream to match the capacity of the channel or network over which it is transmitted. Aspects can test the network prior to transmitting compressed digital video bitstreams by transmitting one or more data packets to a decoder and analyzing return packets to determine an optimal compression ratio for the digital video. Aspects can periodically re-test the network by analyzing data packets sent by the decoder to the encoder that include information regarding the network. Adjusting the bitrate can increase or decrease the spatial and temporal quality of the decoded video bitstream as compared to the input digital video stream, where higher bitrates can support higher quality digital video.

Aspects of disclosed implementations can also transmit compressed video bitstreams over noisy networks by adding forward error correction (FEC) packets to the compressed video bitstream. FEC packets redundantly encode some or all of the information in a digital video bitstream in additional packets included in the bitstream. By processing the additional packets, a decoder can detect missing or corrupt information in a digital video stream and, in some cases, reconstruct the missing or corrupt data using the redundant data in the additional packets. Aspects can adjust parameters associated with FEC based on network information packets received by the encoder as discussed above. Adjusting the FEC parameters dynamically can divide available network bandwidth between transmitting digital video data and FEC data to permit the maximum quality image per unit time to be transmitted under given network conditions.

Aspects of disclosed implementations can change encoder and FEC parameters to permit the highest quality possible digital video to be transmitted for given network conditions as the digital video bitstream is being transmitted. Changing these parameters can also affect the quality of the decoded video stream, since they can cause rapid changes in the appearance of the decoded video as it is being viewed. Aspects can control the changes in encoder and FEC parameters to avoid rapid changes in video quality by analyzing trends in parameter changes and anticipating changes in parameter values.

FIG. 1 is a schematic of a video encoding and decoding system 10 in which aspects of the invention can be implemented. A computing device 12, in one example, can include an internal configuration of hardware including a processor such as a central processing unit (CPU) 18 and a digital data storage exemplified by memory 20. CPU 18 can a controller for controlling the operations of computing device 12, and may be a microprocessor, digital signal processor, field programmable gate array, discrete circuit elements laid out in a custom application specific integrated circuit (ASIC), or any other digital data processor, for example. CPU 18 can be connected to memory 20 by a memory bus, wires, cables, wireless connection, or any other connection, for example. Memory 20 may be or include read-only memory (ROM), random access memory (RAM), optical storage, magnetic storage such as disk or tape, non-volatile memory cards, cloud storage or any other manner or combination of suitable digital data storage device or devices. Memory 20 can store data and program instructions that are used by CPU 18. Other suitable implementations of computing device 12 are possible. For example, the processing of computing device 12 can be distributed among multiple devices communicating over multiple networks 16.

In one example, a network 16 can connect computing device 12 and computing device 14 for encoding and decoding a video stream. For example, the video stream can be encoded in computing device 12 and the encoded video stream is decoded in computing device 14. Network 16 may include any network or networks that are appropriate to the application at hand, such as wired or wireless local or wide area networks, virtual private networks, cellular telephone data networks, or any other wired or wireless configuration of hardware, software, communication protocol suitable to transfer a video bitstream from computing device 12 to computing device 14 and communicate parameters regarding the network from computing device 14 to computing device 12 in the illustrated example.

Computing device 14 can includes CPU 22 and memory 24, which can be similar to components as discussed above in conjunction with the system 12. Computing device 14 can be configured to display a video stream, for example. A display connected to computing device 14 and can be implemented in various ways, including by a liquid crystal display (LCD), a cathode-ray tube (CRT), organic or non-organic light emitting diode display (LED), plasma display, or any other mechanism to display a machine-readable video signal to a user. Computing device 14 can be configured to display a rendering of the video bitstream decoded by a decoder in computing device 14, for example.

Other implementations of encoder and decoder system 10 are possible. In addition to computing device 12 and computing device 14, FIG. 1 shows additional computing devices 26, 28 each having one or more CPUs 30, 34 and memories 32, 36 respectively. These computing devices can include servers, and mobile phones, which can also create, encode, decode, store, forward or display digital video streams, for example. Each of these computing devices can have differing capabilities in terms of processing power and memory availability, including devices for creating video such as video cameras and devices for displaying video.

Figure 2:
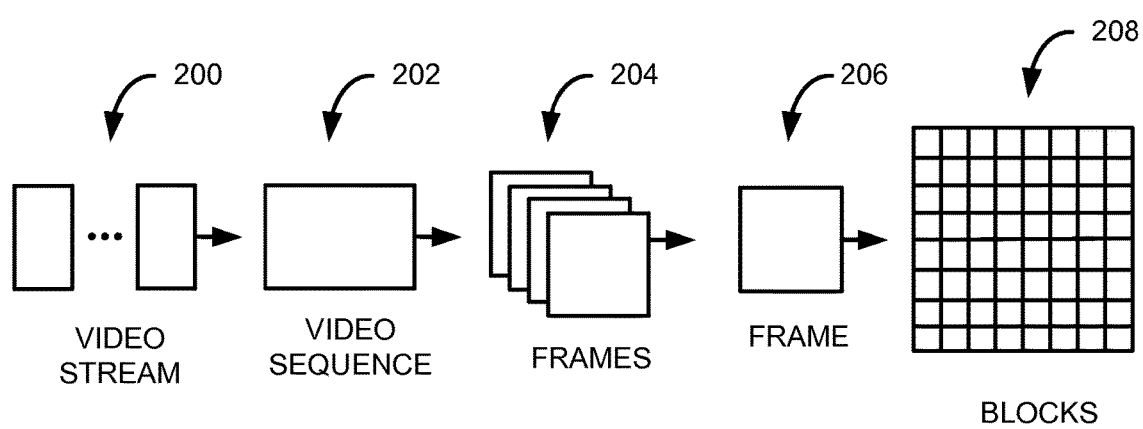
FIG. 2 is a diagram of a video stream in accordance with aspects of disclosed implementations.

FIG. 2 is diagram of a video stream 300 to be encoded and subsequently decoded. Video stream 200 can include a video sequence 202. A video sequence 200 is a temporally contiguous subset of a video stream, also called a group of pictures (GOP). Video sequence 202 can include a number of adjacent video frames 204. While four frames are depicted in adjacent frames 204, video sequence 202 can include any number of adjacent frames. A single example of the adjacent frames 204 is illustrated as the single frame 206. Further sub-dividing the single frame 206 can yield a series of blocks 208. In this example, blocks 208 can contain data corresponding to an N×M pixel region in frame 206, such as luminance and chrominance data for the corresponding pixels. Blocks 208 can be of any suitable size such as 128×128 pixel groups or any rectangular subset of the pixel group.

Figure 3:
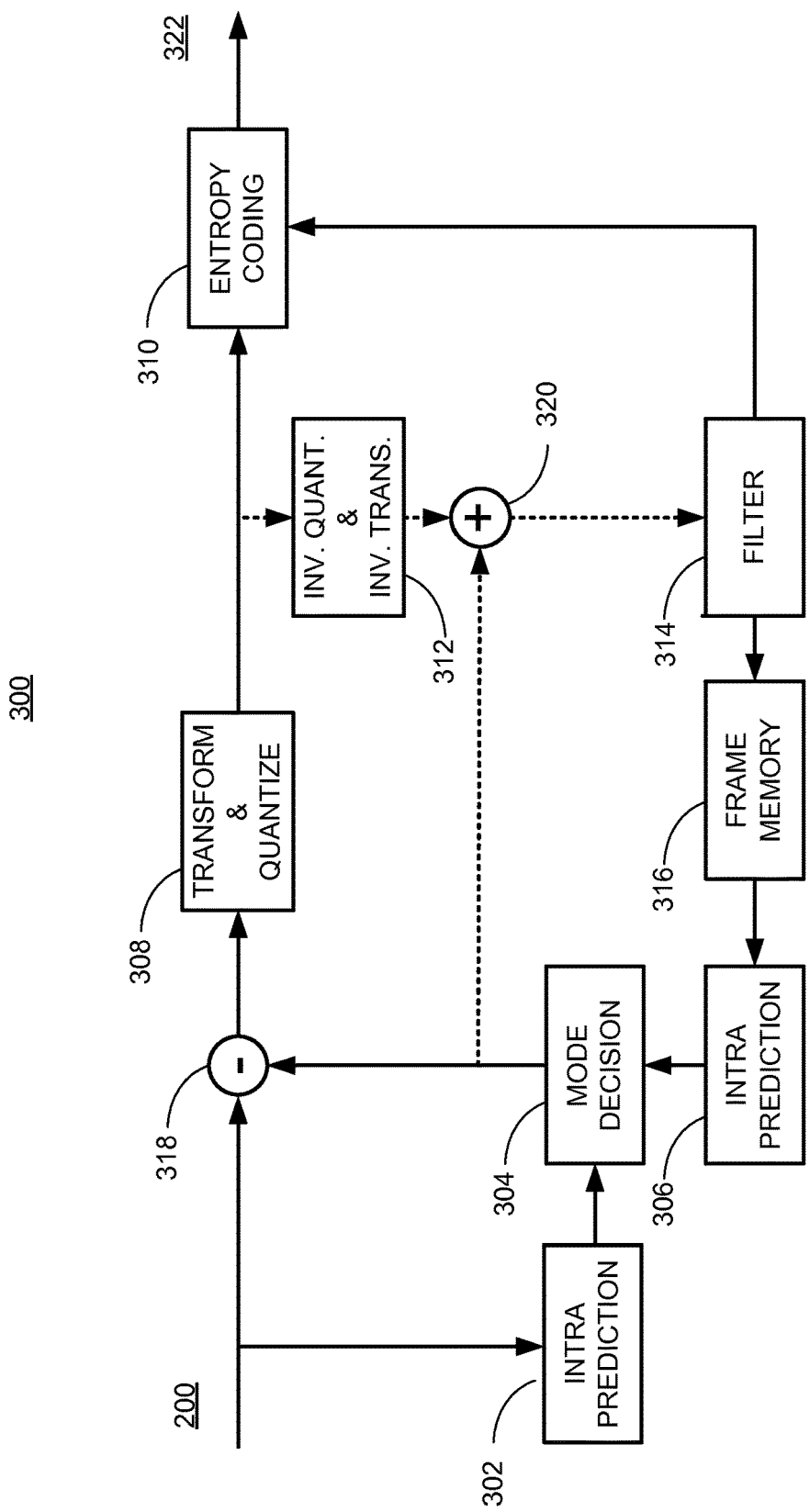
FIG. 3 is a block diagram of a video compression system in accordance with aspects of disclosed implementations.

FIG. 3 is a block diagram of an encoder 300 in accordance with disclosed implementations. Encoder 300 can be implemented in a computing device such as computing device 12. Encoder 300 can encode an input video stream 200. Encoder 300 includes stages to perform the various functions in a forward path to produce an encoded and/or a compressed bitstream 322: an intra prediction stage 302, mode decision stage 304, an inter prediction stage 306, transform and quantization stage 308, a filter stage 314 and an entropy encoding stage 40. Encoder 300 may also include a reconstruction path to reconstruct a frame for prediction and encoding of future blocks. In FIG. 3, encoder 300 includes an inverse quantization and inverse transform stage 312 and a frame memory 316 to reconstruct blocks for prediction. Other structural variations of encoder 300 can be used to encode video stream 200.

When video stream 200 is presented for encoding, each frame (such as frame 206 from FIG. 2) within video stream 200 is processed in units of blocks. Each block can be processed separately in raster scan order starting from the upper left hand block. At intra prediction stage 302 intra prediction residual blocks can be determined for the blocks of video stream 200. Intra prediction can predict the contents of a block by examining previously processed nearby blocks to determine if the pixel values of the nearby blocks are similar to the current block. Since video streams 200 are processed in raster scan order, blocks that occur in raster scan order ahead of the current block are available for processing the current block. Blocks that occur before a given block in raster scan order can be used for intra prediction because they will be available for use at a decoder since they will have already been reconstructed. If a nearby block is similar enough to the current block, the nearby block can be used as a prediction block and subtracted 318 from the current block to form a residual block and information indicating that the current block was intra-predicted can be included in the video bitstream.

Video stream 200 can also be inter predicted at inter prediction stage 306. Inter prediction includes forming a residual block from a current block by translating pixels from a temporally nearby frame to form a prediction block that can be subtracted 318 from the current block. Temporally adjacent frames can be stored in frame memory 316 and accessed by inter prediction stage 306 to form a residual block that can be passed to mode decision stage 304 where the residual block from intra prediction can be compared to the residual block from inter prediction. The mode decision stage 302 can determine which prediction mode, inter or intra, to use to predict the current block. Aspects can use rate distortion value to determine which prediction mode to use, for example.

Rate distortion value can be determined by calculating the number or bits per unit time or bit rate of a video bitstream encoded using particular encoding parameter, such as prediction mode, for example, combined with calculated differences between blocks from the input video stream and blocks in the same position temporally and spatially in the decoded video stream. Since encoder 300 is "lossy", pixel values in blocks from the decoded video stream can differ from pixel values in blocks from the input video stream. Encoding parameters can be varied and respective rate distortion values compared in order to determine optimal parameter values, for example.

At subtraction stage 318 the residual block determined by mode decision stage 304 can be subtracted from the current block and passed to transform and quantize stage 308. Since the values of the residual block can be smaller than the values in the current block, the transformed and quantized 308 residual block can have fewer values than the transformed and quantized 308 current block and therefore be represented by fewer transform coefficients in the video bitstream. Examples of block-based transforms include the Karhunen-Loève Transform (KLT), the Discrete Cosine Transform ("DCT"), and the Singular Value Decomposition Transform ("SVD") to name a few. In one example, the DCT transforms the block into the frequency domain. In the case of DCT, the transform coefficient values are based on spatial frequency, with the DC or other lowest frequency coefficient at the top-left of the matrix and the highest frequency coefficient at the bottom-right of the matrix.

Transform and quantize stage 308 converts the transform coefficients into discrete quantum values, which can be referred to as quantized transform coefficients. Quantization can reduce the number of discrete states represented by the transform coefficients while reducing image quality less than if the quantization were performed in the spatial domain rather than a transform domain. The quantized transform coefficients can then entropy encoded by entropy encoding stage 310. Entropy encoding is a reversible, lossless arithmetic encoding scheme that can reduce the number of bits in the video bitstream that can be decoded without introducing change in the bitstream. The entropy-encoded coefficients, together with other information used to decode the block, such as the type of prediction used, motion vectors, quantizer value and filter strength, are then output as a compressed bitstream 322.

The reconstruction path in FIG. 3, shown by the dotted connection lines, can be used to help ensure that both encoder 300 and decoder 400 (described below with reference to FIG. 4) use the same reference frames to form intra prediction blocks. The reconstruction path performs functions that are similar to functions performed during the decoding process discussed in more detail below, including dequantizing and inverse transforming the quantized transform coefficients at inverse quantize and inverse transform stage 312, which can be combined with a residual block from mode decision stage 304 at adder 320 to create a reconstructed block. Loop filter stage 314 can be applied to the reconstructed block to reduce distortion such as blocking artifacts since decoder 400 can filter the reconstructed video stream prior to sampling it to form reference frames. FIG. 3 shows loop filter stage 314 sending loop filter parameters to entropy coder 310 to be combined with output video bitstream 322, to permit decoder 400 to use the same loop filter parameters as encoder 300, for example.

Other variations of encoder 300 can be used to encode compressed bitstream 322. Encoder 300 stages can be processed in different orders or may be combined into fewer stages or divided into more stages without changing the purpose. For example, a non-transform based encoder 300 can quantize the residual signal directly without transform stage. In another implementation, an encoder 300 may have transform and quantize stage 308 divided into a single stage.

Figure 4:
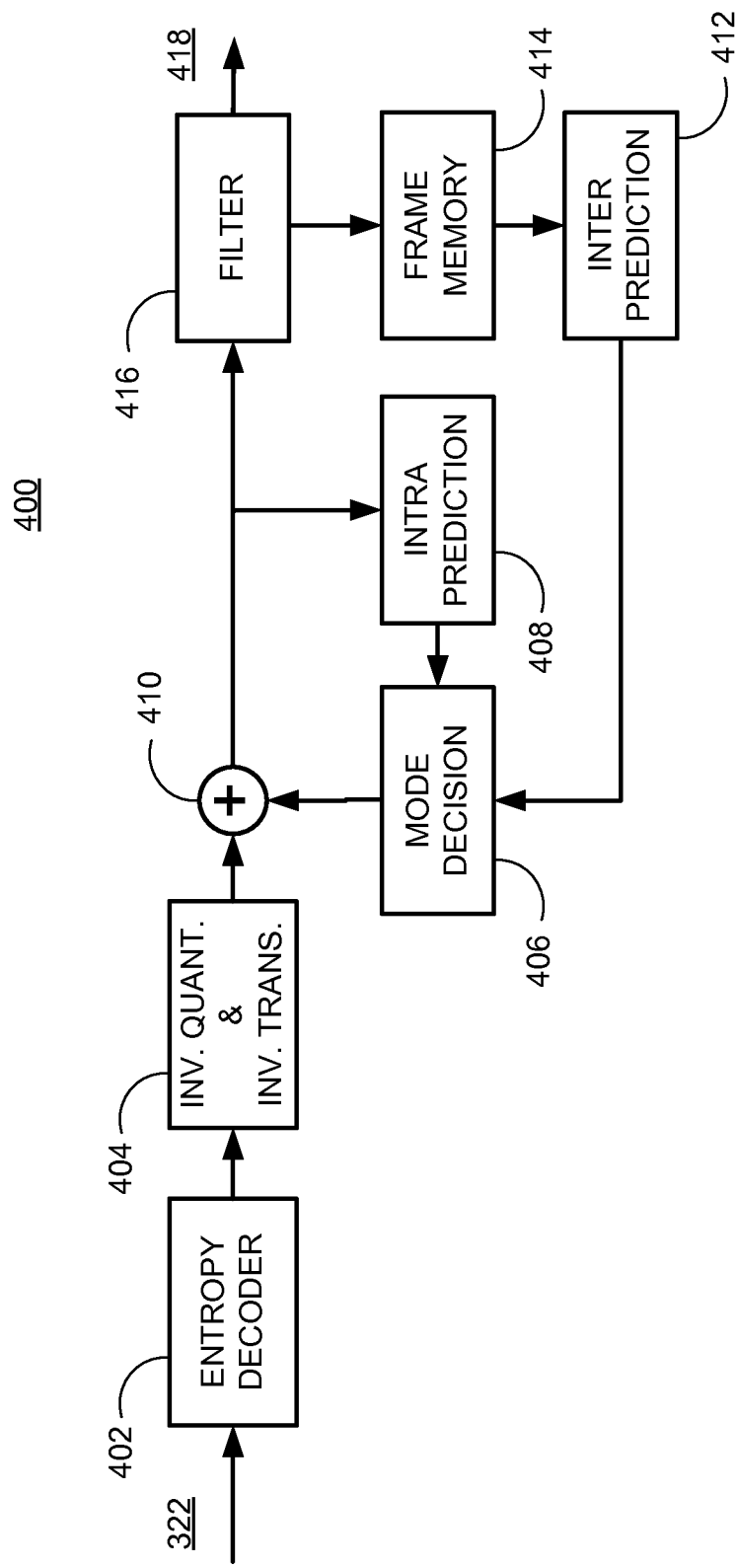
FIG. 4 is a block diagram of a video decompression system in accordance with aspects of disclosed implementations.

FIG. 4 is a block diagram of decoder 400 in according to aspects of disclosed implementations. In one example, decoder 400 can be implemented in computing device 14. Decoder 400 includes the following stages to perform various functions to produce an output video stream 418 from compressed bitstream 322: entropy decoding stage 402, an inverse quantization and inverse transform stage 404, an intra prediction stage 408, an inter prediction stage 412, an adder 410, a mode decision stage 406 and a frame memory 414. Other structural variations of decoder 400 can be used to decode compressed bitstream 322. For example, inverse quantization and inverse transform stage 404 can be expressed as two separate stages.

Received video bitstream 322 can be entropy decoded by entropy decoder 402. Entropy decoder 402 performs an inverse of the entropy coding performed at stage 310 of the encoder 300 to restore the video bitstream to its original state before entropy coding. The restored video bitstream can then be inverse quantized and inverse transformed in similar fashion to inverse quantize and inverse transform stage 312. Inverse quantize and inverse transform stage 404 can restore residual blocks of the video bitstream 322. Note that since encoder 300 and decoder 400 can represent lossy encoding, the restored residual block can have different pixel values than the residual block from the same temporal and spatial location in the input video stream 200.

Following restoration of residual blocks at inverse quantize and inverse transform stage 404, the residual blocks of the video bitstream can be then restored to approximate its pre-prediction state by adding prediction blocks to the residual blocks at adder 410. Adder 410 receives the prediction block to be added to residual blocks at stage 410 from the mode decision stage 406. Mode decision stage 406 can interpret parameters included in the input video bitstream 322 by encoder 300, for example, to determine whether to use intra or inter prediction to restore a block of the video bitstream 322. Mode decision stage 406 can also perform calculations on the input video bitstream 322 to determine which type of prediction to use for a particular block. By performing the same calculations on the same data as the decoder, mode decision state 406 can make the same decision regarding prediction mode as the encoder 300, thereby reducing the need to transmit bits in the video bitstream to indicate which prediction mode to use.

Mode decision stage 406 can receive prediction blocks from both intra prediction stage 408 and inter prediction stage 412. Intra prediction stage 408 can receive blocks to be used as prediction blocks from the restored video stream output from adder 410 since intra prediction blocks are processed in raster scan order, and since blocks used in intra prediction are selected by encoder 300 to occur in the raster scan order before the residual block to be restored occur, intra prediction stage 408 can provide prediction blocks when required. Inter prediction stage 412 creates prediction blocks from frames stored in frame memory 414 as discussed above in relation to encoder 200. Frame memory 414 receives reconstructed blocks after filtering by loop filter 418. Loop filtering can remove blocking artifacts introduced by block-based prediction techniques such as used by encoder 300 and decoder 400 as described herein.

Inter prediction stage 412 can use frames from frame memory 414 following filtering by loop filter 418 in order to use the same data for forming prediction blocks as was used by encoder 300. Using the same data for prediction permits decoder 400 to reconstruct blocks to have pixel values close to corresponding input blocks in spite of using lossy compression. Prediction blocks from inter prediction stage 412 are received by mode decision stage 406 can be passed to adder 410 to restore a block of video bitstream 322. Following loop filtering by loop filter 416, restored video stream 418 can be output from encoder 400. Other variations of decoder 400 can be used to decode compressed bitstream 322. For example, decoder 400 can produce output video stream 418 without loop filter stage 416.

Figure 5:
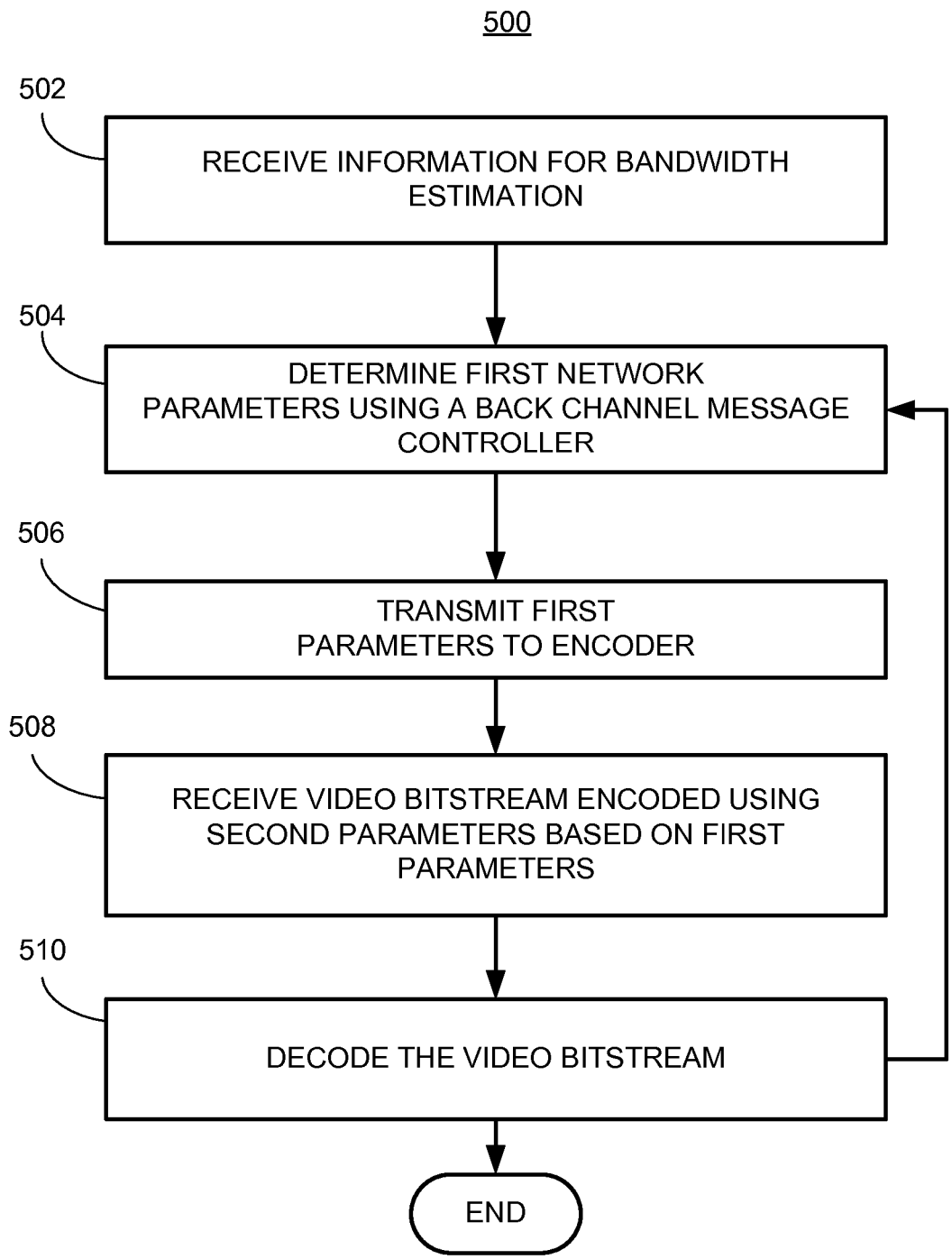
FIG. 5 is a flowchart showing video decoding processing in accordance with aspects of disclosed implementations.

FIG. 5 is a flowchart showing a process 500 for decoding a video bitstream in accordance with disclosed implementations. Process 500 can be performed by a decoding computing device 14 for example. The flowchart diagram in FIG. 5 shows several steps included in process 500. Process 500 can be accomplished with the steps included herein or with more or fewer steps than included here. For example, steps can be combined or divided to change the number of steps performed. The steps of process 500 can be performed in the order included herein or in different orders and still accomplish the intent of process 500. Process 500 begins at step 502 by first receiving, at a computing device 14 for example, information for bandwidth estimation (such as initial bandwidth estimation at the beginning of transmitting a video bitstream. For example, the information can include an encoded video bitstream 322, a portion of the encoded video bitstream, or a random data packet or packets. The random data packets can include packets artificially packed with random data. By receiving we can mean inputting, acquiring, reading, accessing or in any manner receiving an encoded video bitstream. The encoded video bitstream can be encoded by computing device 12 using encoder 300 and transmitted via network 16, for example. The information for initial bandwidth estimation can include, for example, Call and Answer messages exchanged between an encoding process and decoding process 500. For example, Call and Answer messages are a series of packet exchanges that are "stuffed" with data for bandwidth estimation, which can occur either before the call establishment or after the call establishment. The data for bandwidth estimation can include, for example, "dummy" data, random data, or real encoded video data such as the first two video frames, and transmitting a time-interval that can be used to estimate the bandwidth. For example, the Call and Answer messages can be out of band packets that accompany the encoded video bitstream that include packets having a sequence number and a time stamp and a message size in bits based on the variable "Psize" and on a predetermined maximum video rate "Maxbitrate" stored in a configuration file associated with process 500.

By setting Psize, network bandwidth can be estimated in the process of call establishment. When the call is connected, the video encode can initially start encoding the video bitstream using the estimated bandwidth, thus avoiding unreasonable usage of the available network bandwidth. This minimizes the use of Call and Answer messages, thereby preventing the Call and Answer messages from flooding the network by sending too many packets too quickly when the network is slow. Call and Answer messages can be used to determine the true network bandwidth if sufficient number of packets including Call and Answer messages are sent by an encoding computing device 12 and received by a decoding computing device 14 via a network 16. Aspects of disclosed implementations can keep track of Call and Answer messages by assigning a unique packet number to each packet including Call and Answer messages starting with zero and increasing by one for each video stream. A timestamp can also be included in each packet including Call and Answer messages, also starting at zero and increasing with at least millisecond (ms) resolution for each packet sent or some temporal resolution available with high resolution timers associated with computing devices 12 or 14.

Aspects of disclosed implementations can create two groups of Call and Answer messages. In an example, a group of 25 Call messages can be created and sent by an encoding computing device 12 at approximately 100 ms intervals. For networks with bandwidth higher than Maxbitrate, the network bandwidth can be estimated at Maxbitrate. Following the first group of 25 packets, aspects of disclosed implementations can wait, for example, approximately 400 ms before sending a second group of 10 packets.

The time it takes to transmit and receive the first and second groups of packets can be used to indicate the network bandwidth. For example, a 100 Kbps network can take approximately one second to transmit 35 packets included in the first and second groups, assuming 400 bytes (Psize=400) for each packet. At 1200 bytes (Psize=1200) the same network can take approximately three seconds. Transmitting and receiving Call and Answer message packets can take place at the beginning of a video stream, meaning that a user can be waiting until the Call and Answer messages are processed before the video begins.

Returning to FIG. 5, process 500 decodes the information for bandwidth estimation including Call messages, using decoder 400, for example. When the information for initial bandwidth estimation includes only random data packets, this step is unnecessary. At step 504, process 500 can use the received information from step 502 to determine first parameters. For example, process 500 can use the Call messages to determine first parameters (i.e., channel parameters). As discussed above, each Call message can be timestamped when it is created. In addition, process 500 can timestamp each packet with an additional timestamp indicating the time it was received.

Since audio and video both occupy the same network bandwidth, aspects of disclosed implementations can perform dynamic bandwidth estimation based on the video channel and add a predetermined bandwidth for audio. For example, a channel parameter can be sent from a decoding computing device 14 to an encoding computing device 12 as a message. Messages sent from a decoding device 14 to and encoding computing device 12 during transmission of a video bitstream 322 from encoding computing device 12 to decoding computing device 14 can be called back-channel messages. Aspects of disclosed implementations use back channel message transmission and processing to determine network parameters associated with network bandwidth that can be used to optimize encoding parameters.

Upon start up, process 500 can be in a waiting state, ready to receive Call messages as part of a first video bitstream 322. Upon receipt of Call messages by process 500 and determination of first channel parameters at step 504, process 500 can form Answer or acknowledgment (ACK) messages and form them into packets to be transmitted from decoding computing device 14 to encoding computing device 12. At step 506 process 500 can transmit first parameters determined at step 504 to the encoding computing device from the back channel message controller. Further details about the back channel message controller can be found in further description associated with FIG. 7. For example, process 500 can transmit packets using similar techniques as were used to transmit the Call message packets, namely transmit formed Answer message packets until either 25 packets have been sent or six seconds have elapsed. At this point, the decoding computing device can pause transmitting packets and the encoding computing device 12 can determine network bandwidth and packet loss ratios using the received Answer message packets to determine round trip network time, for example.

For example, following a pause to permit the encoding computing device to determine network bandwidth, at step 506 the decoding computing device 14 can form Answer messages and create and transmit packets including Answer messages certain intervals (e.g., at 10 ms intervals). Once the encoding computing device receives the Answer message packets and estimates network bandwidth and packet loss, encoding parameters can be re-calculated that reflect the available bandwidth, packet loss rate and round trip time. Encoding parameters that can be re-calculated based on the bandwidth, packet loss ratio and round trip time include adaptive coding length, FEC ratio, video encoder bitrate, spatial resolution (frame size), temporal resolution (frame rate). During the time that encoding computing device 12 is determining encoding parameters based on Answer messages, the encoding computing device can refrain from transmitting video bitstream data to the decoding computing device 14. During this time period the decoding computing device can remain in a ready state, ready to receive a video bitstream and decode it.

At step 508 process 500 can receive a video bitstream. The bitstream can be encoded with an encoding bitrate determined by initial bandwidth estimation, or the first parameters or both. The video bitstream can be encoded by encoding computing device 12, for example and transmitted to decoding computing device 14. The encoding computing device 12 can form the video stream using encoding parameters based on the Answer messages sent by decoding computing device 14 in response to receiving a first portion of the video bitstream or some random data packets that are sent out of band, etc. Aspects of disclosed implementations can adjust the encoding parameters to match network bandwidth, packet loss ratio and round trip time and thereby optimize the encoding process to provide the highest quality decoded video at decoding computing device 14 for given network bandwidth, packet loss ratio and round trip time.

At step 510 process 500 can decode the video bitstream of the video bitstream using, for example, decoder 400. As the video stream is decoded, process 500 can continue to determine network parameters as discussed above based on received and decoded portions of the video bitstream 322. By determining network parameters from time to time based on timestamps applied to the packets of portions of the video bitstream 322, changes in network bandwidth that may occur while portions of the video bitstream 322 are being received can be detected. For example, encoding computing device 12 can be a server and decoding computing device 14 can be a mobile phone in motion and subject to changing network conditions including changes in network bandwidth.

In some implementations, a first portion of the video bitstream (e.g., "real" video data) encoded using the first parameters can be received from the encoder 300 at decoder 400, which then decodes the first portion of the video bitstream, and determines, using the back channel message controller, the first parameters associated with the first portion of the video bitstream. The first parameters can be transmitted, from the back channel message controller to the encoder 300, as feedback information to control the encoder 300. The decoder 400 receives, from the encoder 300, a second portion of the video stream, in which the second portion of the video stream is encoded using the second parameters, and decodes the second portion of the video bitstream.

When encoding computing device 12 is transmitting the video bitstream 322 encoded with encoding parameters based on an expected bandwidth that is higher than the actual bandwidth of the network, the video bitstream 322 may not be able to be transmitted quickly enough and therefore the network latency will increase. This can be identified by detecting network latency and the calculation of bandwidth from network latency is relatively straightforward. Detection of actual bandwidth that is greater than the expected bandwidth can be more difficult. Without reliable and efficient detection of actual bandwidth being greater than expected bandwidth a decoder that dynamically detects network bandwidth can only go down in time and never go back up.

Bandwidth detection can be based on the assumption that if the expected bandwidth is greater than the available bandwidth, network latency will increase proportionally, while if expected bandwidth is less than the available bandwidth, network latency will not increase. For example if the expected bandwidth is 200 Kbps and the available bandwidth is 100 Kbps, it will take two seconds to transmit one second of video, or some packets will have to be dropped. If the expected bandwidth is 200 Kbps and the available bandwidth is greater than 200 Kbps, it will take one second to transmit one second of video. This can be determined by comparing timestamps included in the packets of a video bitstream 322 with local timestamps created when the video bitstream 322 is received at decoding computing device 14. The relative difference between corresponding timestamp can indicate if the maximum expected bandwidth was reached.

Aspects of disclosed implementations can adaptively respond to changes in network bandwidth both increasing and decreasing by detecting changes network bandwidth from time to time while portions of the video bitstream are being transmitted using back channel messaging at a rate that is high enough to maintain video quality despite changes in network bandwidth without decreasing bandwidth excessively by sending too many back channel messages. Aspects can decrease decoding parameters such as bit rate when network bandwidth is detected decreasing and increase decoding parameters such as bit rate by a small amount when network latency is as expected. In this way, by repeatedly sampling network bandwidth in the manner discussed above and increasing encoding parameters, for example the encoding bitrate, by a small amount each time the network is performing as expected, the maximum bandwidth of the network can be determined in a relatively short period of time.

Aspects of disclosed implementation can filter the relative difference between corresponding timestamps in order to filter out network sampling jitter in the arrival time of an individual packet. Since the technique depends upon differences between received timestamps and locally created timestamps that are subject to network sampling jitter, the differences can include errors caused by the jitter. Techniques can filter out these errors by ignoring differences that fall in a certain small range, for example. In this example small ranges of differences will not be considered as over usage of the network.

Process 500 can determine network parameters by, for example, performing bandwidth estimation using a sliding window based on local time at the decoding computing device 14. The window length can be two seconds or any other predetermined window length.

For example, a bandwidth indicator can be calculated as a function of round trip packet (RTP) time Tgap and predetermined window time Twindow. Network indicator can be calculated as a ratio of Twindow to Tgap, with the following results: a. bandwidth indicator <1, indicating a network delay increase, caused by a network bandwidth shortage. b. bandwidth indicator=1, indicating the network is able to transmit the video without a problem. There potentially can be bandwidth for a higher bitrate. c. bandwidth indicator >1, indicating the arrival of a burst of packets faster than real time. This can be an indication of a network jam currently getting better. This can be the result, for example, a file download being stopped or a bandwidth limiter being released. The arrival of a burst of packets can also indicate an excessively jittery network condition. For most network jitter conditions, the bandwidth indicator will be close to 1.

Other network parameters, such as accumulated time difference Tdacc in RTP time and local time, and the actual received bitrate (Rbitrate), can be calculated using any conventional means. The total number of packets (Ptotal) and the total number of lost packets (Plost) can be obtained by, for example, subtracting the first RTP sequence number from the last RTP sequence number and comparing this to a count of packets received, for example. Ptotal and Plost can be combined into Packetlossratio.

Following bandwidth estimation, process can return to step 504 of process 500 in FIG. 5. At step 506 network parameters determined at step 504 can be transmitted to encoding computing device 12 via a back channel message. The network parameters can include bandwidth indicator, Tdacc, Rbitrate and Packetlossratio as described above. Following step 510, if decoding computing device 14 is still receiving video bitstream 322 data, process 500 can return to step 508 to receive the next video bitstream. If process 500 determines that no more video bitstream 322 data is being received at decoding computing device 14, process 500 can end.

Figure 6:
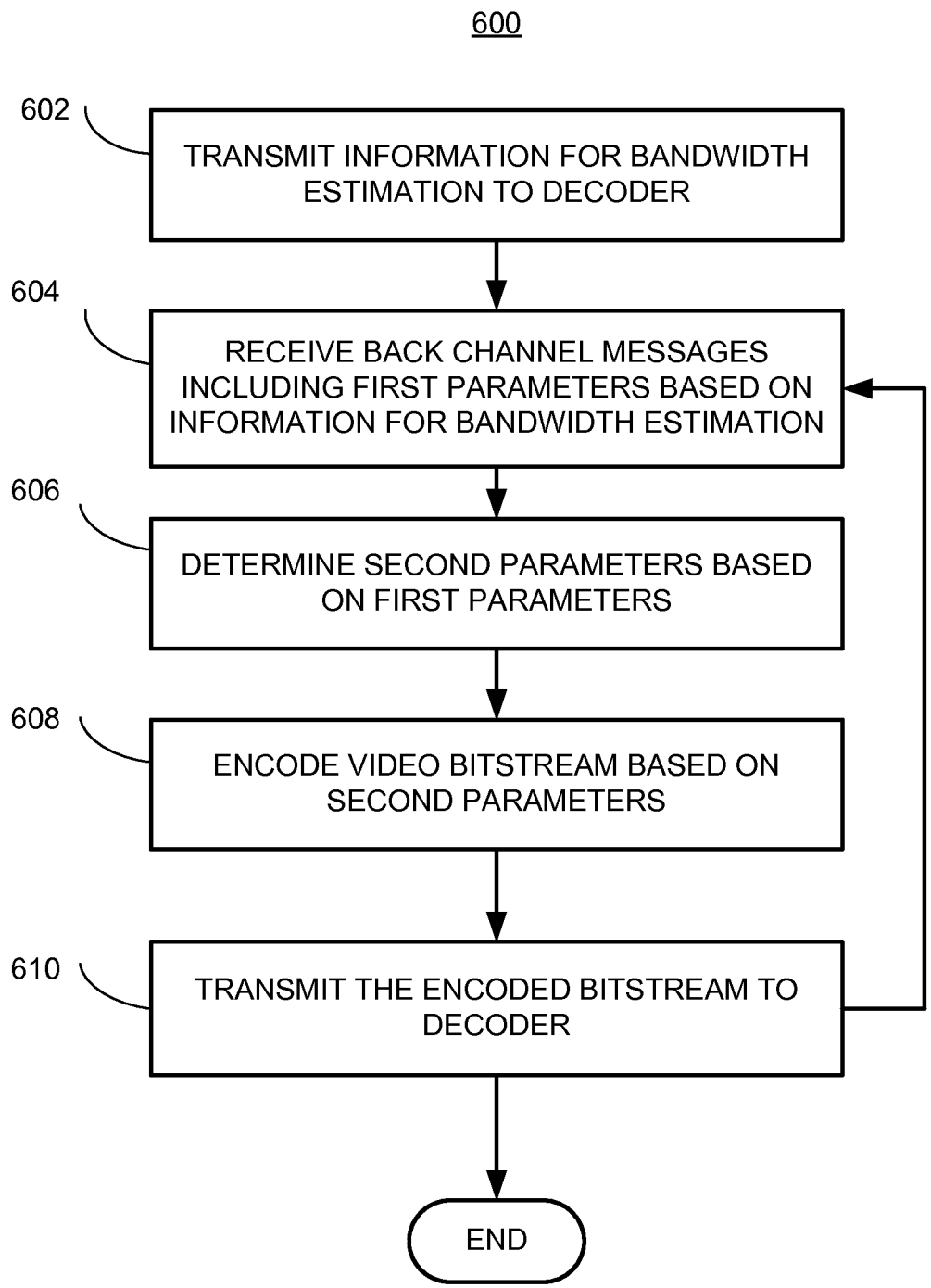
FIG. 6 is a flowchart showing video encoding processing in accordance with aspects of disclosed implementations.

FIG. 6 is flowchart diagram of a process 600 for encoding a video stream 200 according to disclosed implementations. Process 600 can be performed by an encoding computing device 12 for example. The flowchart diagram in FIG. 6 shows several steps included in process 600. Process 600 can be accomplished with the steps included herein or with more or fewer steps than included here. For example, steps can be combined or divided to change the number of steps performed. The steps of process 600 can be performed in the order included herein or in different orders and still accomplish the intent of process 600.

Process 600 begins by, optionally, encoding a first portion of video bitstream 322. This first portion of video bitstream 322 can be encoded including Call messages as described above with respect to FIG. 5. When random data packets are used for initial bandwidth estimation, this step is unnecessary. At step 602, process 600 transmits information for bandwidth estimation to a decoding device. For example, the call messages can be transmitted as part of the video bitstream 322 and received by a decoding computing device 14. The decoding computing device can determine first parameters based on the received Call messages and send Answer messages back to the encoding computing device 12 via a back channel. At step 604 process 600 can receive the first parameters (e.g., back channel messages including the first parameters) and at step 606 can calculate next decoding parameters as discussed above with respect to FIG. 5.

At step 604 encoding computing device 12 can receive the second network parameters via back channel messages. At step 606 process 600 can determine second parameters from the second network parameters. Upon receiving back channel messages from a decoding computing device 14, for example, encoding computing device 12 can analyze the back channel messages and, in combination with other messages and stored parameters including statistics can determine second parameters to be used in encoding the second portion of the video bitstream 322. Encoding parameters include parameters that can be input to the encoding process to adjust the resulting output bitstream with regard to bandwidth and error correction. Examples of encoding parameters include, without limitation, bit rate, FEC ratio, reference frame selection and key frame selection. An example of encoding parameter selection using network parameters is shown by process 800 shown in FIG. 8.

At step 608, process 600 can encode a video bitstream 322 with the encoding parameters determined at step 606.

At step 610 this video bitstream 322 can be transmitted by encoding computing device 12 via network 16 to a decoding computing device 14. Decoding computing device can receive the video bitstream 322 and determine second network parameters as already discussed above with respect to FIG. 5.

Figure 7:
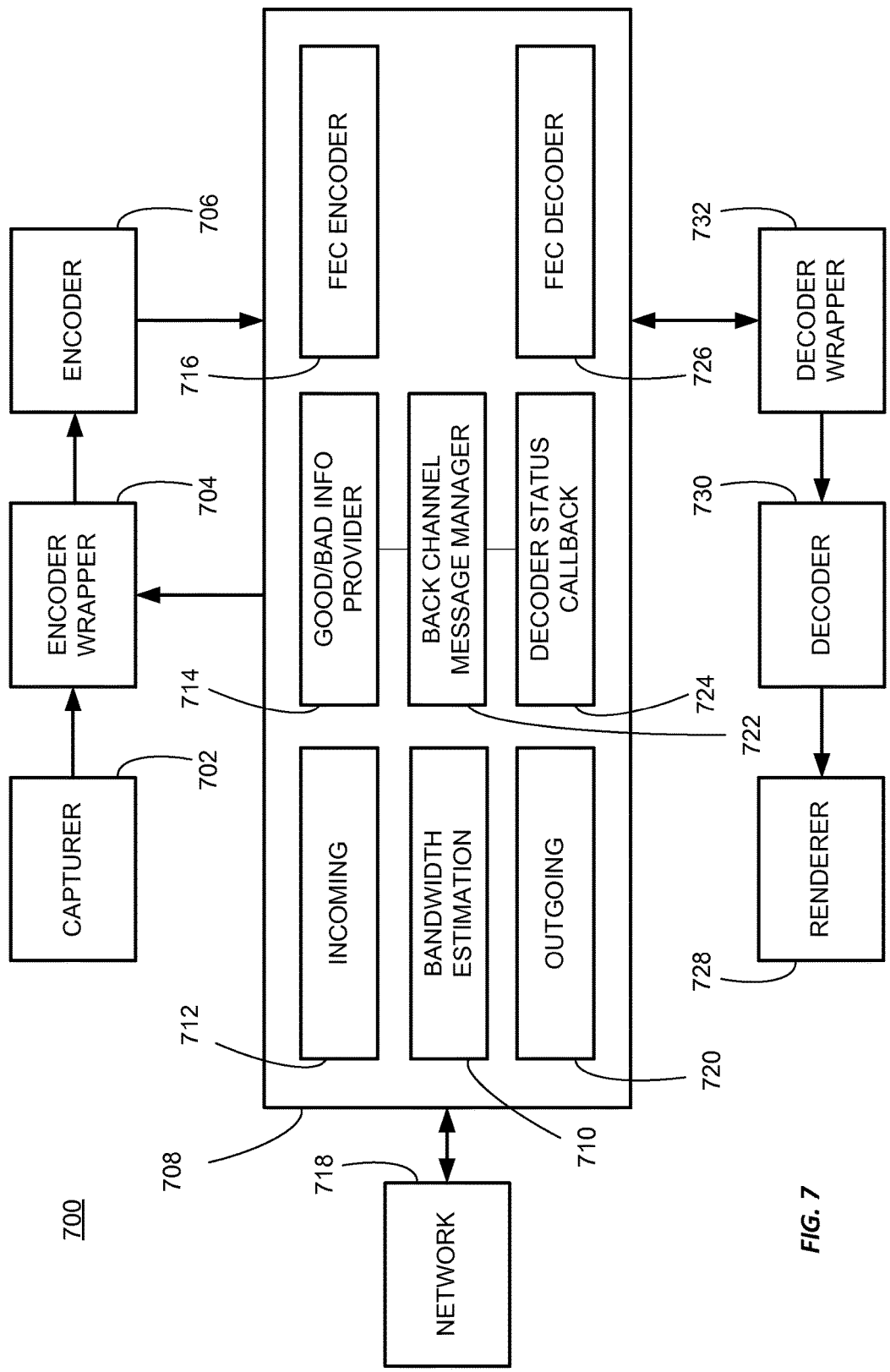
FIG. 7 is a diagram of a video encoding and decoding system including a back channel message manager in accordance with aspects of disclosed implementations.

FIG. 7 is an example of a codec 700 including a back channel message manager according to disclosed implementations. Codec 700 can implement processes 500, 600 and 800 as shown in to FIGS. 5, 6 and 8 and described above. Codec 700 can be implemented using a computing device 12, 14. Codec 700 can either encode a video stream 200 or decode a video bitstream 322 depending upon how it is instructed at run time. Codec 700 can acquire video stream data 200 using a capturer 702. Capturer 702 can acquire uncompressed video stream data either via live data acquisition, for example with a video camera, or by reading video stream data from a storage device or a network, for example.

When codec 700 is operating as an encoder, capturer 702 can pass the uncompressed video stream 200 to encoder wrapper 704. Encoder wrapper 704 can examine the input uncompressed video stream 200, receive parameters from back channel manager 708 and read stored parameters and statistics from non-transitory storage devices to determine encoder parameters to send to encoder 706 along with the video stream 200. Encoder 706 can be an encoder similar to encoder 300 in FIG. 3. Encoder 706 can use the received encoder parameters to encode the video stream 200 to result in an encoded video bitstream 322 having an expected bit rate selected by back channel manager 708. Encoder can pass the packets included in the encoded video bitstream to FEC encoder 716, where FEC packets can be created and added to the output video bitstream according to FEC encoding parameters including FEC_ratio for example. The FEC encoder can then pass the packets included in the output video bitstream to the outgoing 720 data module for transmission via network 718.

When codec 700 is operating as a decoder, packets included in an encoded video bitstream 322 can be received from network 718 by incoming 712 data module and passed to FEC decoder 726. FEC decoder can strip FEC packets from the incoming video bitstream and restore lost or corrupt packets if necessary and if possible. FEC decoder can send information regarding lost or unrecoverable packets to good/bad info provider 714, for example. FEC decoder can then send the video bitstream 322 to decoder wrapper 732 along with decoder parameters. Decoder wrapper can examine the video bitstream and return parameter information, for example timestamps and sequence numbers of packets, to decoder status callback 724. Decoder 730 can be similar to decoder 400 shown in FIG. 4. Decoder 730 can decode the video bitstream 322 according to the passed decoder parameters and output the decoded video stream to render 728, where the video stream can be rendered for display on a display device attached to decoding computing device 14 or stored on a non-transitory storage device, for example.

In addition to encoding and decoding video data, codec 700 includes back channel message manager 722. Back channel message manager 722 is responsible for creating, transmitting and receiving Call and Answer messages as described above. When operating in encoding mode, back channel message manager 722 can transmit Call messages via outgoing 720 data module to the network 718 and receive Answer messages from the network 718 via incoming 712 data module. The received Answer messages can be analyzed by bandwidth estimation 710 module to determine network parameters. The back channel message manager 722 can send and receive back channel messages via incoming 712 and outgoing 720 ports and manage the calculation and collection of network parameters using decoder status callback 724 and bandwidth estimation 710 to be used in setting encoder parameters. Operating in decoding mode, back channel message manager 724 can receive Call messages from network 718 using incoming 712 port, determine network parameters using bandwidth estimation 710 and create Answer messages to transmit via outgoing 720 port and network 718.

Bandwidth estimation 710 module can estimate available network bandwidth based on received and calculated network parameters including round trip delay, decoder side receiving bit rate, packet loss ratio and decoder side bandwidth indicators including bandwidth indicator and accumulated indicator. Encoding parameters determined by back channel controller 708 can include FEC strength, bit rate, number of reference frames and which reference frames to use. The FEC encoder can adaptively change it FEC strength and packet size according to encoding parameters determined by the back channel controller 708.

One aspect of codec 700 is the ability to change the number of reference frames used for intra prediction dynamically to suit changing network conditions.

Figure 8:
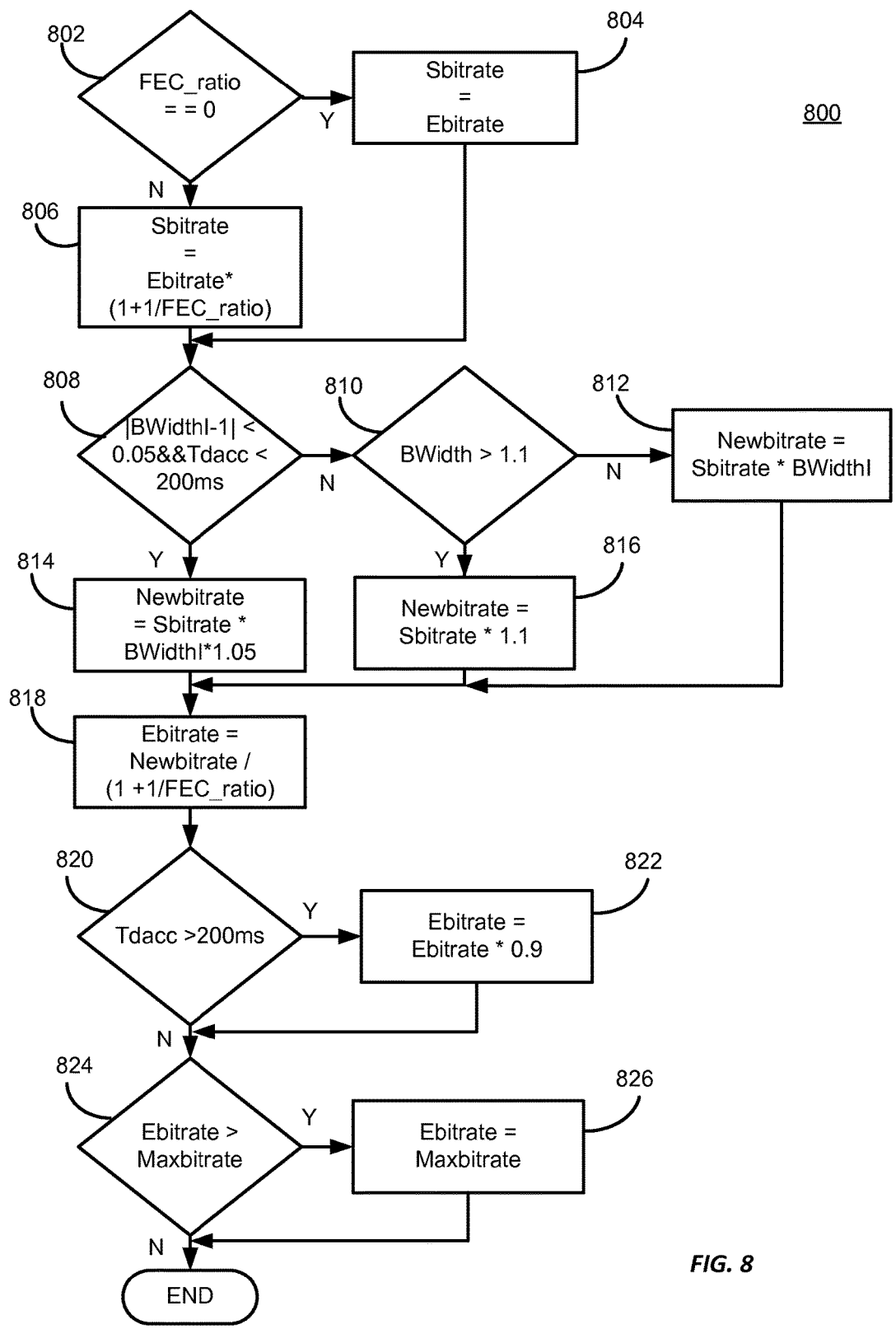
FIG. 8 is a diagram of an example process for determining bit rate in accordance with an implementation.

FIG. 8 is an example flowchart diagram of a process 800 for determining bit rate according to an implementation. Process 800 can be performed by an encoding computing device 12 for example. The flowchart diagram in FIG. 8 shows several steps included in process 800. Process 800 can be accomplished with the steps included herein or with more or fewer steps than included here. For example, steps can be combined or divided to change the number of steps performed. The steps of process 800 can be performed in the order included herein or in different orders and still accomplish the intent of process 800.

As discussed above, (FEC) is an error correction technique that adds additional packets to the packets of a video bitstream to permit a receiver to recover lost or corrupted packets without requiring retransmission of the packet data. Each packet of the output video bitstream can be protected by zero or more packets of FEC data, e.g. a packet of the output video bitstream can be either unprotected by FEC packet data or protected by multiple FEC packets depending upon the predetermined importance of the packet in decoding the video bitstream. For example, packets including motion vectors can be protected by more FEC packet data than coefficients representing pixel data for an intermediate frame. The process of protecting the packets of a video bitstream using FEC packets can be controlled by several parameters, one of which, FEC_ratio, describes the ratio between video bitstream data packets and FEC packets.

Process 800 begins at step 802 with the assumptions that FEC_ratio is set to the current value being used to protect the current video bitstream 322, the current encoder bit rate is set to Ebitrate and the predetermined maximum bit rate permitted is Maxbitrate. At step 802, process 800 tests FEC_ratio to see if it is 0, and if so, at step 804 sets the variable Sbitrate=Ebitrate. At step 806, if FEC_ratio~=0, Sbitrate=Ebitrate(1+1/FEC_ratio). This has the effect of incrementing the current bit rate proportional to the amount of FEC protection.

At step 808 received network parameter bandwidth indicator (BWidthI) is normalized to 0 and tested to see if it is less than 0.05 and that the received network parameter current accumulated time difference (Tdacc) is less than 200 ms, for example. If these are both true, the network is handling the current bitrate, therefore at step 814 process 800 can increase the expected bitrate by about 5% by setting the variable Newbitrate=Sbitrate*BWidthI*1.05. If the test at step 808 is false, at step 810 bandwidth indicator BWidthI is tested to see if it is greater than 1.1 and if so, the network can be on a fast burst as discussed above, and therefore at step 816 process 800 can probe the network to see if this means the network bandwidth has increased by setting the variable Newbitrate to Sbitrate*1.1, a 10% increase in bit rate. If at step 810 it is determined that BWidthI<1.1, the network delay is increasing, therefore the bit rate is adjusted down by setting Newbitrate=Sbitrate*BWidthI.

At step 818 the expected bit rate Ebitrate is set=Newbitrate/(1+1/FEC_ratio) to compensate for the additional bits to be added to the bitstream by FEC. At step 820 the accumulated delay is tested to see if it is greater or equal to its expected value of 200 ms. If it is, then at step 822 the network delay is increasing and the expected bit rate Ebitrate is set to 90% of its value. If at step 820 the network delay is less than its expected value, at step 824 Ebitrate is checked to see if it is greater than the permitted maximum Maxbitrate. If so, at step 826 it is reduced to be equal to Maxbitrate. Following these steps the process 800 can return to step 606 of FIG. 6 to complete process 600.

Returning to FIG. 6, following determination of second parameters at step 606, process 600 can determine if additional portions of the video bitstream 322 remains to be encoded. If true, process 600 can return to step 608 to encode a second portion of the video bitstream 322 using encoding parameters determined at step 606. As discussed above, the frequency with which encoding parameters are determined will determine how smoothly and quickly process 600 can respond to changes in network bandwidth, while not decreasing network bandwidth significantly by adding back channel messages. If process 600 determines that no further video stream data remains, process 600 can end.

The words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

The implementations of transmitting station 12 and/or receiving station 30 and the algorithms, methods, instructions, and such stored thereon and/or executed thereby can be realized in hardware, software, or any combination thereof. The hardware can include, for example, computers, intellectual property (IP) cores, ASICs, programmable logic arrays, optical processors, programmable logic controllers, microcode, microcontrollers, servers, microprocessors, digital signal processors or any other suitable circuit. In the claims, the term "processor" encompasses any of the foregoing hardware, either singly or in combination. The terms "signal" and "data" are used interchangeably. Further, portions of transmitting station 12 and receiving station 30 do not necessarily have to be implemented in the same manner.

Further, in one implementation, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a cell phone or other hand-held communications device. In this instance, transmitting station 12 can encode content using an encoder 70 into an encoded video signal and transmit the encoded video signal to the communications device. In turn, the communications device can then decode the encoded video signal using decoder 100. Alternatively, the communications device can decode content stored locally on the communications device, such as content that was not transmitted by transmitting station 12. Other suitable transmitting station 12 and receiving station 30 implementation schemes are available. For example, receiving station 30 can be a generally stationary personal computer rather than a portable communications device and/or a device including encoder 70 may also include decoder 100.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding a video bitstream, comprising:
    determining, using a back channel message controller, first parameters for bandwidth estimation based on a sequence number, a timestamp, and a size of a call message;
    transmitting, from the back channel message controller, a back channel message including feedback data comprising the first parameters to an encoding computing device, wherein the feedback data comprises first data generated by a FEC decoder and second data generated by a video decoder, and the feedback data is used by the encoding computing device to:
        update encoding parameters based on the first parameters for bandwidth estimation, wherein the updated encoding parameters are used by a FEC encoder to update a FEC strength and a packet size; and
        select reference frames to use for decoding the video bitstream, wherein the number of reference frames is determined based on the updated encoding parameters;
    receiving, from the encoding computing device, the video bitstream encoded using the updated encoding parameters; and
    decoding the video bitstream.

2. The method of claim 1, further comprising:
    receiving, by the encoding computing device, the call message comprising at least one specifically generated data packet of random data for bandwidth estimation from the encoding computing device;
    receiving, from the encoding computing device, video-data packets of a first portion of the video bitstream encoded using the first parameters;

updating, using the back channel message controller, the first parameters for bandwidth estimation based on sequence numbers, timestamps, and sizes of the video-data packets;

transmitting, from the back channel message controller, the back channel message including the feedback data comprising updated first parameters to the encoding computing device; and receiving, from the encoding computing device, a second portion of the video bitstream, wherein the second portion of the video bitstream is encoded using the updated encoding parameters adjusted based on the updated first parameters.

3. The method of claim 1, wherein the encoding parameters are determined based on an estimated bandwidth for video coding, the estimated bandwidth is determined based on the first parameters, and a predetermined bandwidth for audio is reserved for the estimated bandwidth.

4. The method of claim 3, further comprising:
setting an expected bandwidth used to determine the encoding parameters to be equal to the estimated bandwidth based on a determination that the estimated bandwidth is less than the expected bandwidth.

5. The method of claim 3, further comprising:
setting an expected bandwidth used to determine the encoding parameters to be greater than the estimated bandwidth based on a determination that the estimated bandwidth is equal to the expected bandwidth.

6. The method of claim 1, wherein the first parameters further comprise one or more of a packet loss ratio, a round trip delay, a receiving bitrate, a bandwidth indicator, an accumulated indicator, good reference frame information, or bad reference frame information.

7. The method of claim 1, wherein the call message is received as a call-message data packet having a predetermined size and timing information to enable bandwidth estimation.

8. The method of claim 1, wherein decoding the video bitstream comprises:
processing forward error correction (FEC) packets to correct missing or corrupt video bitstream data.

9. A method for encoding a video sequence, comprising:
receiving, from a decoding computing device comprising a video decoder and a FEC decoder, a back channel message including feedback data comprising first parameters for bandwidth estimation, wherein the feedback data comprises first data generated by the FEC decoder and second data generated by the video decoder, and the feedback data is used by a back channel message controller to:
update encoding parameters based on the first parameters for bandwidth estimation, wherein the updated encoding parameters are used by a FEC encoder to update a FEC strength and a packet size; and
select reference frames to use for encoding a first portion of the video sequence, wherein the number of reference frames is determined based on the updated encoding parameters;
encoding the first portion of the video sequence using the updated encoding parameters; and
transmitting the encoded first portion of the video sequence to the decoding computing device.

10. The method of claim 9, further comprising:
transmitting, by the decoding computing device, a call message comprising at least one specifically generated data packet of random data for bandwidth estimation to the decoding computing device;
transmitting video-data packets of the first portion of the video sequence to the decoding computing device;
receiving, from the decoding computing device, the back channel message including the first parameters updated based on sequence numbers, timestamps, and sizes of the video-data packets;
adaptively adjusting the encoding parameters based on the updated first parameters; and
encoding a second portion of the video sequence based on the adaptively adjusted encoding parameters.

11. The method of claim 10, wherein a call message is transmitted as a call-message data packet having a predetermined size and timing information to enable bandwidth estimation.

12. The method of claim 9, wherein the encoding parameters are determined based on an estimated bandwidth for video coding, the estimated bandwidth is determined based on the first parameters, and a predetermined bandwidth for audio is reserved from the estimated bandwidth.

13. The method of claim 12, further comprising:
setting an expected bandwidth used to determine the encoding parameters to be equal to the estimated bandwidth based on a determination that the estimated bandwidth is less than the expected bandwidth.

14. The method of claim 12, further comprising:
setting an expected bandwidth used to determine the encoding parameters to be greater than the estimated bandwidth based on a determination that the estimated bandwidth is equal to the expected bandwidth.

15. The method of claim 9, wherein the first parameters comprise one or more of a packet loss ratio, a round trip delay, a receiving bitrate, a bandwidth indicator, an accumulated indicator, good reference frame information, or bad reference frame information, the method further comprising:
receiving, from the encoding computing device, a call message comprising at least one specifically generated data packet of random data for bandwidth estimation.

16. The method of claim 9, wherein encoding the first portion of the video sequence comprises:
encoding the first portion of the video sequence using forward error correction (FEC) packets.

17. An apparatus for decoding a video bitstream, comprising:
a memory; and
a processor operative to execute instructions stored in the memory to:
determine, using a back channel message controller, first parameters for bandwidth estimation based on sequence numbers, timestamps, and sizes of a call message;
transmit, from the back channel message controller, a back channel message including feedback data comprising the first parameters to an encoding computing device, wherein the feedback data comprises first data generated by a FEC decoder and second data generated by a video decoder, and the feedback data is used by the encoding computing device to:
update encoding parameters based on the first parameters for bandwidth estimation, wherein the updated encoding parameters are used by a FEC encoder to update a FEC strength and a packet size; and
select reference frames to use for decoding the video bitstream, wherein the number of reference frames is determined based on the updated encoding parameters;

receive, from the encoding computing device, the video bitstream encoded using the updated encoding parameters; and decode the video bitstream.

18. The apparatus of claim 17, further comprising instructions stored in the memory to:

receive, from the encoding computing device, the call message comprising at least one specifically generated data packet of random data for bandwidth estimation;

receive, from the encoding computing device, video-data packets of a first portion of the video bitstream encoded using first encoding parameters;

update, using the back channel message controller, the first parameters for bandwidth estimation based on sequence numbers, timestamps, and sizes of the video-data packets;

transmit, from the back channel message controller, the back channel message including the feedback data comprising the updated first parameters to the encoding computing device; and receive, from the encoding computing device, a second portion of the video bitstream, wherein the second portion of the video bitstream is encoded using the updated encoding parameters adjusted based on the updated first parameters.

19. The apparatus of claim 17, wherein the first parameters comprise one or more of a packet loss ratio, a round trip delay, a receiving bitrate, a bandwidth indicator, an accumulated indicator, good reference frame information, or bad reference frame information.

20. The apparatus of claim 17, wherein the call message is received as a call-message data packet having a predetermined size and timing information to enable bandwidth estimation.

* * * * *